ns Patent Office
2,983,668
Patented May 9, 1961

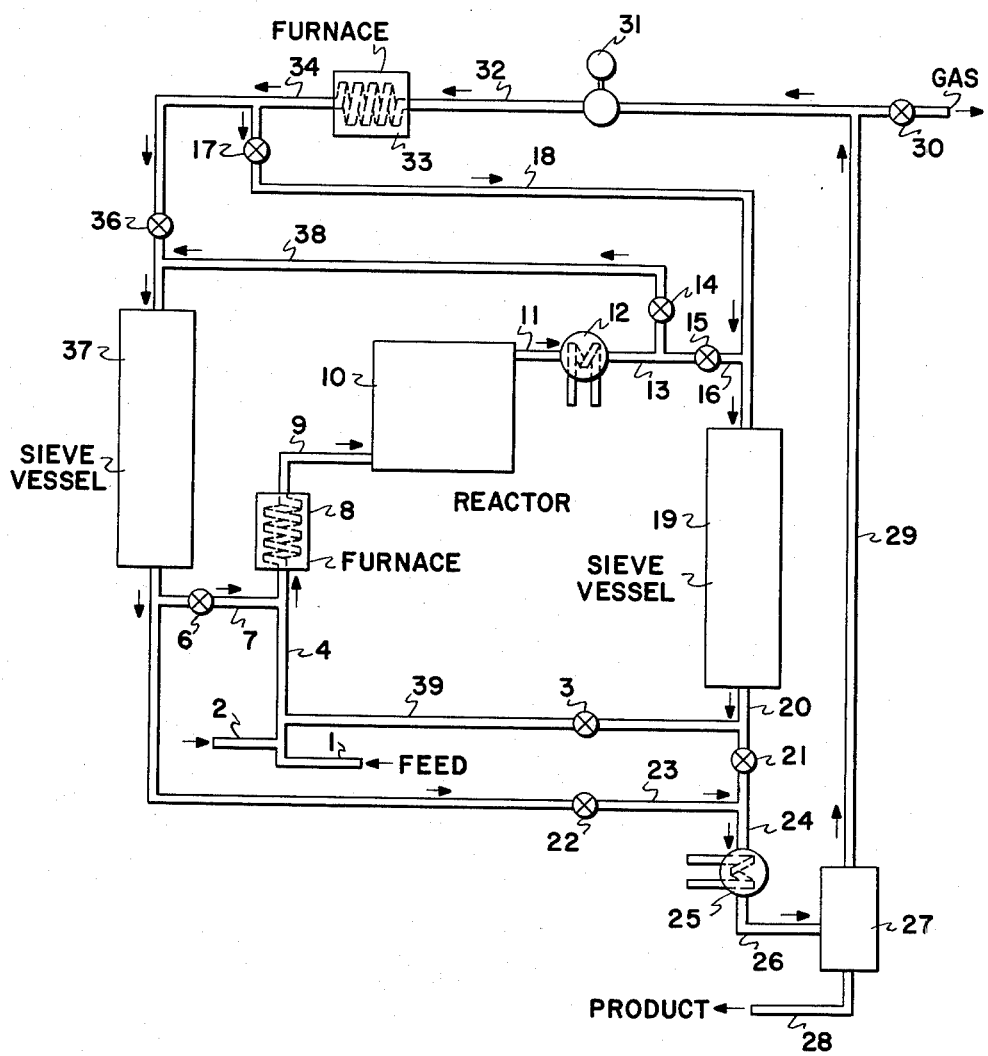

2,983,668

NAPHTHA REFORMING AND RECYCLE GAS SYSTEM

Charles E. Hemminger, Westfield, N.J., assignor to Esso Research and Engineering Company, a corporation of Delaware Filed Jan. 29, 1958, Ser. No. 711,870

3 Claims. (Cl. 208—95)

The present invention relates to the catalytic conversion of hydrocarbons in the presence of hydrogen and particularly to using a selective adsorbent such as a molecular sieve or a silica gel material on (1) the effluent from or (2) the feed to the catalytic conversion zone. Thus for the former of these a material more suitable for recycling to the conversion zone is separated and for the latter a material more suited for initial processing is separated. More particularly, the present invention relates to a completely continuous process in which two or more adsorbent or molecular sieve-containing vessels are used so that one is on stream while the other is simultaneously being freed of adsorbed material by having hydrogen recycle gas from the process pass through it at a temperature 100°–500° F. higher than the temperature of the adsorbent or sieve during adsorption. Specifically, it relates to passing hydrocarbon vapors which have been separated from a feed or product stream by a selective adsorbent and which are particularly suitable for processing in the hydrocarbon conversion zone intermixed with recycle gas from said hydrocarbon conversion process directly to the said conversion zone. Most specifically, it relates (1) to an operation in which n-paraffins in the product stream from vapor phase isomerization are separated on 5 A. molecular sieve material are then desorbed therefrom by heated recycle gas from the process and are then passed directly in combination with said recycle gas and without condensation back to the isomerization reactor; and (2) to an operation in which hydroformate vapors are passed over 13 A. molecular sieve or silica gel material to remove aromatic constituents from said vapors and in which the unadsorbed hydrocarbons and hydrogen-containing recycle gas are passed directly back to the hydroforming reactor.

By the present process as exemplified in (1) and (2) immediately above the material to be recycled is separated without the necessity of condensing the product from the conversion zone or separating out the recycle gas and thus in both cases the recycle hydrocarbons are returned to the conversion zone in combination with necessary hydrogen-containing recycle gas available from the process. In this way, great savings are obtainable in the size of product recovery equipment required and in heating and cooling costs.

Vapor phase hydroisomerization is a well known and widely used process for upgrading hydrocarbon fractions boiling substantially in the motor gasoline or naphtha range to increase their octane number which consists essentially in contacting said fractions at elevated temperature and pressures and in the presence of hydrogen process gas with solid catalyst to produce a product containing isomeric forms of the hydrocarbons. Although a number of catalytic materials may be employed to promote hydroisomerization, nickel deposited upon silica-alumina or platinum deposited upon alumina are particularly useful. Isomerization may also be carried out by means of a Friedel-Crafts catalyst, such as $AlCl_3$ used in the presence of a substantial partial pressure of hydrogen to improve selectivity and prolong catalyst life. Hydroisomerization, for example, may be carried out with a catalyst containing 5 wt. percent nickel on silica-alumina at a pressure of about 350 p.s.i.g. and at a temperature of about 700° F. to isomerize a wide variety of normal paraffins falling within the gasoline boiling range.

Hydroforming is likewise well known and widely used for upgrading hydrocarbon fractions boiling in the motor gasoline or naphtha boiling range to increase their octane number and to improve their burning or engine cleanliness characteristics. In hydroforming the hydrocarbon fraction or naphtha is contacted at elevated temperatures and pressures and in the presence of hydrogen or hydrogen enriched process gas with solid catalytic materials under conditions such that there is no net consumption of hydrogen and ordinarily there is a net production of hydrogen in the process. A variety of reactions occur during hydroforming, including dehydrogenation of naphthenes to the corresponding aromatics, hydrocracking of paraffins, isomerization of straight chain paraffins to form branched chain paraffins, dehydrocyclization of paraffins and isomerization of compounds such as ethyl-cyclopentane to form methylcyclohexane which is readily converted to toluene. In addition to these reactions, some hydrogenation of olefins and polyolefins occurs and sulfur or sulfur compounds are eliminated by conversion to hydrogen sulfide or to catalytic metal sulfides making the hydroformate burn cleaner or form less engine deposits when used as the fuel in an internal combustion engine.

Hydroforming operations are ordinarily carried out at temperatures of 750°–1150° F. in the pressure range of about 50 to 1000 pounds per square inch and in contact with such catalysts as molybdenum oxide, chromium oxide, or in general, oxides or sulfides of metals of groups IV, V, VI, VII and VIII of the periodic system of elements alone or generally supported on a base or spacing agent such as alumina gel, precipitated alumina or zinc aluminate spinel. A good hydroforming catalyst is one containing about 10 wt. percent molybdenum oxide upon an aluminum oxide base prepared by heating a hydrated aluminum oxide or upon a zinc aluminate spinel. A good platinum hydroforming catalyst is one employing an alcoholate alumina base, preferably in the eta phase, carrying 0.6% by weight of platinum. Catalyst of lower platinum content may be used. It may also be desirable to add small amounts of silica to the catalyst. Hydroforming can be carried out in a variety of ways. It has been proposed in U.S. 2,689,823, issued September 21, 1954, to effect the hydroforming of naphtha fractions in the presence of a dense fluidized catalyst mass in a fluidized solids reactor system in which naphtha vapors are passed continuously through the dense fluidized bed of hydroforming catalyst particles in a reaction zone, spent catalyst particles being withdrawn from the dense bed in the reaction zone and passed to a spent catalyst regeneration zone where inactivating carbonaceous deposits are removed by combustion, whereupon the regenerated catalyst particles are returned to the main reactor vessel. Fixed bed hydroforming, of course, is conducted by passing the naphtha vapors through a fixed bed of catalyst and if regeneration is required, shutting down the particular reactor, purging to remove reactant vapors, withdrawing the catalyst, or regenerating in situ by passing an oxygen-containing gas through such catalyst bed.

Selective adsorbents have been known and used commercially for many years. Of particular note is the more recent use of synthetic and natural zeolites as adsorbents. These so-called molecular sieves have the property of separating straight chain from branched chain and ring hydrocarbons in one species thereof, i.e. the 5 A. molecular sieves type, and of separating aromatic from non-aromatic components in another species of sieve, the 13 A. type. These zeolites have innumerable pores of uniform size for a particular species. The pores vary in diameter from less than 3 or 4 to 15 or more Angstrom units. Almost all the adsorptive surface is within the crystal cavities to which the pores represent the sole entry. Therefore, only molecules that are small enough to enter the pores can be adsorbed. Additionally, a separation is obtained between those molecules small enough to enter in that polar molecules are preferentially adsorbed. In addition to the naturally occurring zeolites certain synthetic zeolites also have molecular sieve properties as taught by Barrer in U.S. Pat. 2,306,610 and by Black in U.S. Pat. 2,442,191. 5 A. molecular sieves are preferred for separating normal paraffins from branched chain naphthenic, and aromatic hydrocarbons, only the former molecules being small enough to pass through the 5 A. openings of the sieve. This adsorbent is the preferred one for treating the vaporus effluent from the hydroisomerization reactor. This sieve may be prepared by rapidly mixing an aqueous solution of sodium meta silicate and an aqueous solution of sodium aluminate at a temperature of about 180° F. in proportions such that the mixture has a ratio of $SiO_2:Al_2O_3$ of about 1.5 to 1. A precipitate forms instantaneously of the desired crystalline sodium alumino-silicate which is then withdrawn and treated with an aqueous solution of calcium chloride to replace at least a portion of the sodium content of said material with calcium. The material is then calcined to obtain the desired 5 A. synthetic molecular sieve zeolite.

Molecular sieves of about 6 to 15 A., preferably 13 A. are preferred for separating aromatics from non-aromatic hydrocarbons. Separation here is based mainly not on the size of the molecules which are admitted into the pores but on the polar character of the molecule, polar compounds being preferentially adsorbed. A 13 A. sieve may be prepared by reaction of a sodium silicate having a high ratio of sodium to silica, e.g. sodium metasilicate with a sodium aluminate having a soda-to-alumina ratio of from 1:1 to 3:1, the proportion of sodium silicate solution to sodium aluminate solution being such that the ratio of silica-to-alumina in the final mixture is at least 3:1 and preferably from about 4:1 to about 10:1. Preferably the sodium aluminate solution is added to the sodium metasilicate solution at ambient temperatures while employing rapid and efficient agitation so as to ensure the formation of a precipitate having an essentially uniform composition throughout. The resulting homogeneous paste is heated to about 180° to 215° F. for a period as long as 200 hours or more to ensure that the crystals thereby formed will have the desired pore size of about 13 A. After the period of heat soaking, the precipitated sodium alumino-silicate is filtered and water washed and then dried and activated in a calcining zone preferably at a temperature of about 700° to 900° F.

The present invention will be more clearly understood by reference to the accompanying drawing which diagrammatically illustrates a flow plan for equipment which can be utilized in the carrying out of either of the two octane improvement processes which have been described and which are susceptible to improvement by the use of the present invention. It is, of course, apparent that other catalytic conversion processes taking place in the presence of hydrogen-containing gas also are susceptible to being improved by this invention, and that separation on the feed stream as well as on the product stream is within the scope of this invention.

The drawing will first be explained with reference to the vapor phase hydroisomerization followed by 5 A. molecular sieve treatment process previously mentioned.

A light naphtha boiling in the range of 110° F. to about 180° F. is heated to a temperature sufficiently high to vaporize it and is supplied to the system through naphtha feed line 1 and is joined by make-up $H_2$ added through line 2. Small percentages of HCl or $Cl_2$ in the order of 0.5–1 mol. percent may be added to this make-up $H_2$ to activate the catalyst in the reaction zone. The combined stream flows past closed valve 3 and is joined in line 4 by recycle gas and desorbed normal paraffins supplied through open valve 6 and line 7. This stream is then passed through furnace 8 and line 9 to hydroisomerizer 10 where it is contacted with a fixed bed of metal hydroisomerization catalyst such as is described above under pressures of about 200–1000 p.s.i., temperatures of about 500–800° F., space velocities of 1–20 w./hr./w. and gas rates of 500–5000 c.f./b. The hydroisomerizate is then passed through line 11 to cooler 12 where its temperature is reduced sufficiently for efficient adsorption but not to a point where any appreciable condensation occurs. Alternatively, isomerization utilizing a Friedel-Crafts type catalyst and the following conditions may be employed in reactor 10: temperatures of 150°–250° F., pressures of 300–1000 p.s.i., space velocities of 0.1–2 w./hr./w., and gas rates of 20–200 c.f./b. When these conditions are used an auxiliary furnace and cooler arrangement will be necessary to heat the recycle stripping gas to 500°–700° F. to desorb the sieve with subsequent cooling of the stream before it is recycled to the reactor. This is because of the low temperature in the reactor. The partially cooled but essentially vaporous isomerizate is then passed through line 13 past closed valve 14 through open valve 15, through line 16 past closed valve 17 in line 18 into adsorbent vessel 19. There the sieve material picks up the normal paraffin material and the remainder of the hydroisomerizate passes from the vessel through line 20 past closed valve 3 through open valve 21 past closed valve 22 in line 23 through line 24 to condenser 25. The uncondensed hydrogen recycle gas and liquid stream is then passed through line 26 to separator 27 from which high octane liquid product is passed through line 28 to storage or gasoline blending facilities. The overhead recycle gas from separator 27 is passed through line 29 past partially open valve 30 (through which excess gas is released from the system), through compressor 31 and line 32 to furnace 33. In this furnace the gas is heated to a temperature 100°–500° F. higher than the temperature in sieve vessel 19 during the adsorption part of its cycle. A portion or all of furnace 33 and cooler 12 may be heat exchange equipment which cools the stream in line 11 while heating the stream in line 32 so as to conserve heat in the system. From furnace 33 the heated recycle gas is passed through line 34 past closed valve 17 through open valve 36 into sieve vessel 37. This vessel is on the desorbing portion of its cycle having been saturated with n-paraffins from the hydroisomerizate stream during its adsorbing service. It is now stripped of this material by the heated recycle gas which increases the temperature and lowers the hydrocarbon partial pressure in the vessel. The recycle gas and desorbed n-paraffins are passed past closed valve 22 in line 23 through open valve 6 and line 7 and rejoin the feed and make-up hydrogen stream in line 4. When sieve vessel 19 becomes saturated, valve 15 in line 16 is closed and product from the hydroisomerizer 10 is passed through open valve 14 and line 38 past closed valve 36 to freshly desorbed sieve vessel 37. This vessel is exactly similar to sieve vessel 19 and also adsorbs n-paraffins from the hydroisomerizate. The stream from vessel 37 passes closed valve 6 and flows through open valve 22 and line 23 past closed valve 21 to line 24 from which it is passed to processing as previously described. The separated recycle gas after flowing through furnace 33 now, however, passes past closed valve 36 through open valve 17 and line 18 past closed valve 15 to sieve vessel 19. The sieves in this vessel are then desorbed and the n-paraffins and recycle gas are passed through line 20 past closed valve 21 through open valve 3 and line 39 to rejoin feed and make-up hydrogen in line 4. Thus it can be seen that this hydroisomerization process using at least two molecular sieve vessels is both simple and economical and entirely continuous.

Turning now to the hydroforming followed by 13 A. molecular sieve process, vaporized feed and recycle gas enter reactor 10 as described above. Hydroforming reactor 10 is operated at temperatures of 850–1000° F., pressures of 50–750 p.s.i., space velocities of 0.5–5 w./hr./w. and gas rates of 3000–10,000 c.f./b. From reactor 10 the hydroformate is cooled to somewhat lower than dewpoint temperature in scrubber 12 and heavy ends are removed by partial condensation in the presence of a small amount of scrubbing oil. The overhead then passes into sieve vessel 19 which is filled with a selective solid adsorbent like 13 A. molecular sieve or silica gel material which removes most of the aromatics from the hydroformate vapor stream. Most of the effluent vapor is then recycled past partially closed valve 21 through open valve 3 and line 39 back to the feed and recycle gas stream in line 4. In order to remove make gas the remainder, about 15–25% of the total stream, is passed through said partially closed valve 21 to hydrocarbon recycle gas separation. The hydrocarbons so separated and passed through line 28 may, if desired, be recycled to the hydroforming zone but only if separate recycle gas hydrocarbon separation facilities are provided for this non-aromatic stream. In any event recycle gas is passed to sieve vessel 37 which is on its desorption cycle having been saturated with aromatics previously adsorbed from the hydroformate stream. This aromatic recycle gas stream is then passed from sieve vessel 37 past closed valve 6 through open valve 22 and line 23 pass partially closed valve 21 to recycle gas hydrocarbon separation. From line 28 high octane aromatic product is available for gasoline blending or other purposes. As mentioned above, this stream will be diluted with some non-aromatic product entering through partially closed valve 21 unless separate recycle gas hydrocarbon separation facilities are provided for this stream. When sieve vessel 19 becomes saturated with aromatics as may be determined by conventional means such as refractive index, specific gravity, or spectographic analysis of the effluent, valve 16 is closed and hydroformate flows through open valve 14 and line 38, past closed valve 36 to freshly desorbed sieve vessel 37 from which effluent flows past partially closed valve 22 through open valve 6 and line 7 back to the feed and recycle gas stream in line 4. The part of the effluent passing through partially closed valve 22 is passed to recycle gas hydrocarbon separation facilities as previously described from which facilities recycle gas is passed past closed valve 36 through open valve 17 and line 18 past closed valve 15 to sieve vessel 19. Therein aromatics are stripped from the sieve and passed past closed valve 3 through open valve 21 to aromatics product recovery as described about for the previous half of the cycle. Thus for this process also it is apparent that the simple and efficient, continuous system of this invention provides great savings in equipment, heat and material requirements.

The following examples are illustrative of the present invention:

*Example I*

An Arabian naphtha boiling in the range of 100° to 180° F. and having a 55–60 research clear octane number is supplied to hydroisomerization reactor 10. This hydroisomerization reactor contains a fixed bed of 4.5% nickel on silica-alumina catalyst at 650° F., 350 pounds per square inch pressure, 10 weight of hydrocarbon feed per hour per weight of catalyst, and with 1,000 cubic feet of hydrogen per barrel of hydrocarbon supplied. The vaporized isomerizate is passed at 200° F. through a bed of molecular sieves having pore openings of about 5 A. until the sieves are about 90% saturated with normal paraffins. The desorption of the normal paraffins is done at a temperature of 600° F. and with 1–3 ft.$^3$/lb. of sieve of recycle gas containing about 85% hydrogen. A product having a research clear octane number of 90 in 97 vol. percent yield is obtained by this process.

*Example II*

An Arabian naphtha boiling in the range of 200° to 325° F. and having a 35–40 research clear octane number is hydroformed by contacting with a catalyst comprising 0.6 wt. percent platinum deposited on alcoholate alumina at a temperature of 920° F., a pressure of 350 p.s.i.g., a feed rate of 1–2 weight of naphtha feed per hour per weight of catalyst, and in the presence of 6,000 cubic feet of recycle hydrogen per barrel of feed. The hydroformate is passed at 250° F. through a bed of molecular sieves having pore openings of about 13 A. until the sieves are about 90% saturated with aromatics. The desorption of the aromatics is conducted at a temperature of 850° F. and with 5–10 ft.$^3$/lb. sieve of recycle gas containing about 75% hydrogen. A single recycle gas hydrocarbon separation system is used (thus as mentioned in the description of the drawing, some non-aromatic hydrocarbons are passed to product) and a product of 97 research clear octane number obtained in 73 vol. percent based on feed yield results.

The foregoing description contains a limited number of embodiments of the present invention. It will be understood, however, that this invention is not limited thereto since numerous variations are possible without departing from the scope of the following claims.

What is claimed is:

1. In a continuous hydrocarbon conversion process wherein a hydrocarbon feed is contacted in a conversion zone with a catalyst and hydrogen-containing gas at an elevated temperature to produce vaporous reaction products, the improvement which comprises contacting said vaporous reaction products leaving said hydrocarbon conversion zone with a molecular sieve material contained in a first sieve zone to selectively adsorb one group of hydrocarbons present in the vaporous reaction products, cooling at least part of the unadsorbed vaporous reaction products to condense normally liquid hydrocarbons, separating hydrogen-rich gas from said liquid hydrocarbons, recovering the separated liquid hydrocarbons as product, passing the separated hydrogen rich gas over spent molecular sieve material contained in a second sieve zone previously used in a selective adsorption step for the same type of reaction products to desorb selectively adsorbed hydrocarbons therefrom and carrying out the desorption step at a higher temperature than said adsorption step, charging this mixture of desorbed hydrocarbons and hydrogen rich gas along with fresh hydrocarbon feed to said hydrocarbon conversion zone, continuing this procedure until the adsorptive power of the molecular sieve material in the first sieve zone is substantially spent and exchanging said sieve zones and proceeding with the process as aforementioned.

2. In a continuous hydrocarbon hydroisomerization process wherein a naphtha feed is contacted in a hydroisomerization zone with a catalyst and hydrogen-containing gas at an elevated temperature to produce vaporous reaction products, the improvement which comprises contacting said vaporous reaction products leaving said hydroisomerization conversion zone with a molecular sieve material contained in a first sieve zone to selectively adsorb normal paraffin hydrocarbons present in the vaporous reaction products, cooling the unadsorbed vaporous reaction products to condense normally liquid hydrocarbons, separating hydrogen rich gas from said liquid hydrocarbons, recovering the separated liquid hydrocarbons as product, passing the separated hydrogen rich gas over spent molecular sieve material contained in a second sieve zone previously used in a selective adsorption step for hydroisomerized hydrocarbons to remove selectively adsorbed normal paraffin hydrocarbons therefrom and carrying out the desorption step at a higher temperature than said adsorption step, charging this mixture of desorbed normal paraffin hydrocarbons and hydrogen rich gas along with fresh naphtha feed to said hydroisomerization conversion zone, continuing this procedure until the adsorptive power of the molecular sieve material in the first sieve zone is substantially spent and exchanging said sieve zones and proceeding with the process as aforementioned.

3. A process according to claim 2 wherein the hydroisomerized products leaving said hydroisomerization zone and before passing to said adsorption step are only sufficiently cooled to improve the adsorption step without effecting any appreciable condensation of hydrocarbon liquids from said hydroisomerized products.

References Cited in the file of this patent

UNITED STATES PATENTS

| | | |
|---|---|---|
| 2,566,613 | Hepp | Sept. 4, 1951 |
| 2,818,449 | Christensen et al. | Dec. 31, 1957 |
| 2,859,173 | Hess et al. | Nov. 4, 1958 |
| 2,886,509 | Christensen et al. | May 12, 1959 |